United States Patent
Stapler

[11] 3,771,363
[45] Nov. 13, 1973

[54] TURBINE-TYPE FLOW RESPONSIVE DEVICE

[76] Inventor: W. Mead Stapler, One Dey Ln., Riverdale, N.J. 07457

[22] Filed: June 12, 1972

[21] Appl. No.: 262,107

[52] U.S. Cl. .............................................. 73/231 R
[51] Int. Cl. .............................................. G01f 1/00
[58] Field of Search ............................. 73/229, 231

[56] References Cited
UNITED STATES PATENTS

| | | | |
|---|---|---|---|
| 1,593,291 | 7/1926 | Critchlow | 73/231 R |
| 3,003,354 | 10/1961 | Wood | 73/231 R |
| 3,342,070 | 9/1967 | Walch | 73/231 R |
| 3,610,039 | 10/1971 | Althouse et al. | 73/231 R |
| 3,636,767 | 1/1972 | Duffy | 73/231 R |
| 3,518,880 | 7/1970 | Kullman et al. | 73/231 R |

Primary Examiner—Richard C. Queisser
Assistant Examiner—Arthur E. Korkosz
Attorney—Ralph R. Roberts

[57] ABSTRACT

This invention pertains to flow meters and in particular to fluid flow measuring apparatus characterized as having a turbine mechanism where a blade of a turbine as it is brought in way of a magnetic pickup causes a pulse to be actuated. This electrical signal is read as an increase in voltage, or a transducer reads the number of pulses to determine the rate of flow. In particular, the present flow meter incorporates a probe which in addition to carrying the turbine blades or propeller also carries the magnetic pickup on a stem or post portion which is made as an integral unit so that said probe may be removed from or inserted into a housing for placement in the midstream of a larger passageway to read the flow in said passageway. This embodiment enables a probe of one size and design to be used in any one of several different diameters of conduits to measure the rate of flow and provides a flow meter having an installation versatility not heretofore known.

7 Claims, 9 Drawing Figures

PATENTED NOV 13 1973 3,771,363

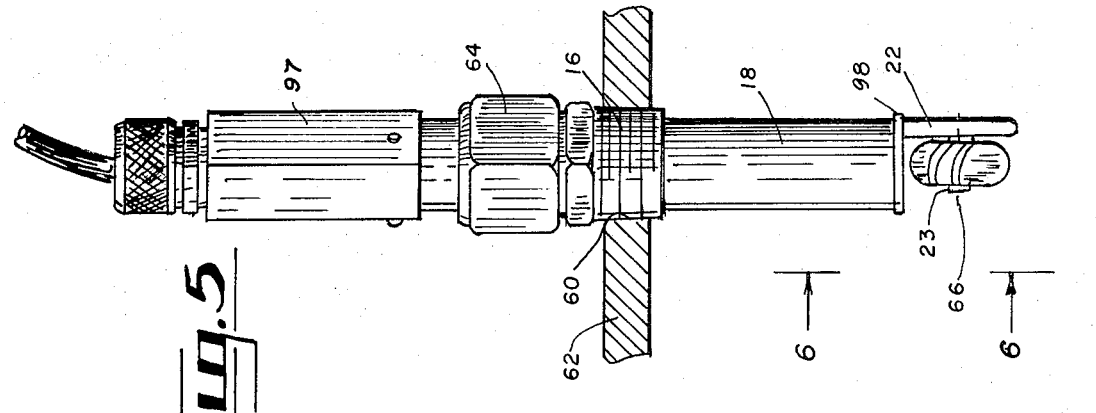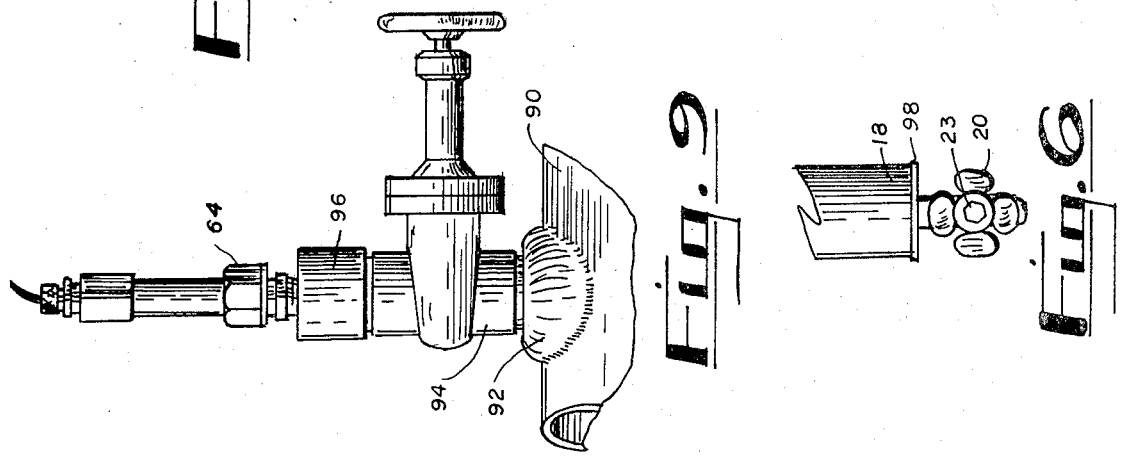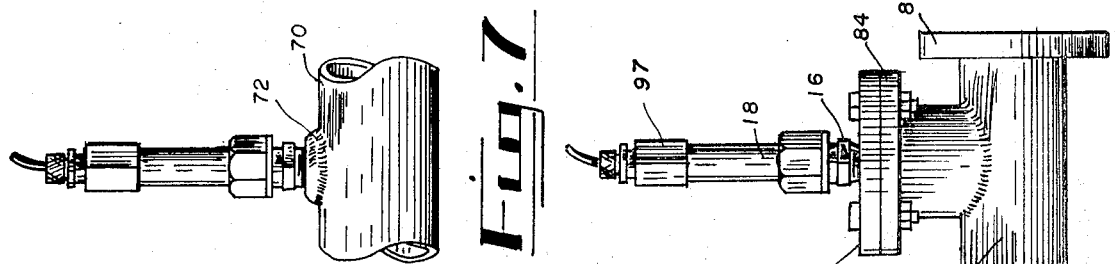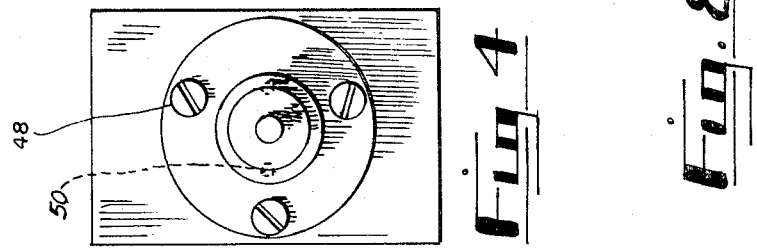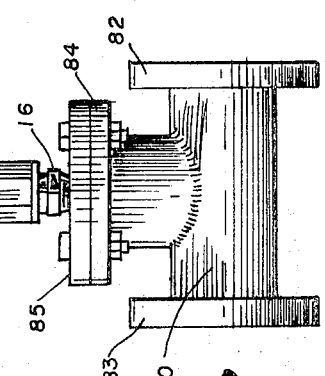

TURBINE-TYPE FLOW RESPONSIVE DEVICE

BACKGROUND OF THE INVENTION

1. Field of the Invention

With respect to the classification of art as established in the U.S. Patent Office this invention is found in the general class entitled, "Measuring and Testing" and the subclass therein entitled, "turbine type" and the further subclass of "with end supply and delivery." Also to be noted is the subclass entitled, "volume or rate of flow meter."

2. Description of the Prior Art

Turbine-type flow meters are generally well known and usually are constructed so as to have elongated housings in which a shaft is centrally mounted to carry the bladed turbine. On the shaft is mounted a propeller type blade which is rotatable on this shaft. This housing often includes radial extensions to support the shaft. The rotational velocity of the shaft may be read or the turning blades themselves may be a function of the volume rate of the flow of the fluid. These blades, for example, as they rotate past a magnetic pickup cause a voltage or pulse to be generated each time a blade passes by the pickup. The number of pulses generated is therefore representative of the total volume of flow through the fluid passageway with the number of pulses per unit time being computed to indicate the volume rate of the fluid flow through the housing.

The magnetic pickup may be used in one of two ways in that the pulses may be read and fed to a computer type electronic apparatus to cause the pulses to be computed as a rate or flow, or the magnetic pickup may be used to cause an electromotive force to be developed in a coil with the force being proportionate to the rate of movement of the blades so that a rate of flow can be read on a voltmeter type instrument and the dial calibrated to indicate the rate of fluid flow. Many U.S. Patents are representative of this type of construction. For example, U.S. Pat. No. 3,101,615 to PAVONE as issued on Aug. 27, 1963 shows a magnetic pickup type of flow meter. Others of similar construction are seen in U.S. Pat. No. 2,975,635 to KINDLER as issued on Mar. 21, 1961; U.S. Pat. No. 3,177,711 to HAM as issued on Apr. 13, 1965; and U.S. Pat. No. 3,342,070 to WALCH as issued on Sept. 19, 1967.

It is to be particularly noted in these patents and in others that are known that the turbine blade is constructed so as to pass substantially close to the outer diameter of the flow meter passageway. For example, in KINDLER, U.S. Pat. No. 2,975,635 it is to be noted that the turbine apparatus and support are carried in a flange housing of determined diameter which housing tightly and snugly engages the turbine support and a journal portion near the flange junction of the apparatus. Such a housing and means of turbine support is quite expensive to manufacture and requires that the unit be made to a particular size for mounting in a conduit of a given size, for example, one and one-half inches, two inches, two and one-half inches, three inches, etc. In the PAVONE U.S. Pat. No. 3,101,615 the support for the turbine is expensive in that it is retained by radially disposed ribs which support the shaft of the turbine. The positioning of this device is a complicated procedure in that the blades must be very carefully positioned in way of the magnetic transducer. The inductor coil 24 as seen in the PROVONE patent must be precisely placed in order that the rectifier provides the discrete voltage pulses. Like situations are seen in U.S. Pat. No. 3,350,938 to RITTENHOUSE as issued on Nov. 7, 1967 and in U.S. Pat. No. 3,342,070 to WALCH as issued Sept. 19, 1967 in that the problem of supporting the turbine blade and shaft and positioning said blade in way of a magnetic pickup is a great problem. The housings for such installations are, of course, made special and require joining fixtures requiring elaborate machining on the inside of the housings.

In the present invention a probe is made which carries the turbine blade on a shaft carried on the end of a post-like support with the rotating blades maintained in a fixed relation to the magnetic pickup. This whole unit is carried as an integral probe or pipe which may readily be inserted into a pipe flange, a support block, valve or the like and only requires that the turbine be positioned at the midpoint of the flow path so as to give a reading on the velocity of the flow at this point in the stream.

SUMMARY OF THE INVENTION

This invention may be summarized at least in part by reference to its objects.

It is an object of this invention to provide, and it does provide, a turbine-type flow meter in which a lightweight turbine is carried upon a stand or support with the support carrying a magnet pickup in a precise relationship to the turbine blades and their sweep path. The probe support is adapted for mounting in a block or a pipe component so as to be readily removable therefrom. The turbine, although of a fixed diameter of rotation, is not particularly dependent upon the diameter of the conduit into which it is inserted for measuring the flow.

It is a further object of this invention to provide, and it does provide, a turbine-type flow meter which employs an inexpensive housing of plastic which permits ready installation of said turbine-type flow meter into a hydraulic system. This flow meter includes a turbine mounted upon the end of a probe which is inserted to the side of said block and positioned substantially central of the diameter of the flow passageway therein. This block is adapted for ready mounting into standard pipelines.

It is a further object of this invention to provide, and it does provide, a turbine-type flow meter in which the turbine is carried upon the inner end of the probe having a threaded pipe support fitting at its entering end. This fitting is adapted to retain the probe in a threaded portion of a pipe wall with the probe slidably carried in the threaded collar of the probe support.

In summary, the invention provides a turbine-type flow meter in which the turbine is lightweight and is carried upon a shaft mounted on the end of the support extending from the probe housing. The probe support or stem carries a magnetic pickup which is actuated by a magnet carried by and rotated with the turbine. The blades of the turbine may be of magnetic material, have a magnet inserted therein, or at least made slightly magnetic so as to trigger the magnetic pickup as the turbine is rotated. The turbine carried by and at the end of the probe is substantially smaller than the actual passageway carrying the fluid with the shank or stem of the probe having a sufficient extent adapted to permit adjustment into a passageway which is only one of several having diameter variations of three to four or more inches of diameter.

In addition to the above summary the following disclosure is detailed to insure adequacy and aid in understanding of the invention. This disclosure, however, is not intended to prejudice that purpose of a patent which is to cover each new inventive concept therein no matter how it may later be disguised by variations in form or additions of further improvements. For this reason there has been chosen a specific embodiment of the flow meter probe and a block housing for carrying said probe as adopted for use in hydraulic lines and showing a preferred means of adjustable construction and mounting of the probe in other pipe fittings.

This specific embodiment and alternate embodiments thereof have been chosen for the purposes of illustration and description as shown in the accompanying drawings wherein:

BRIEF DESCRIPTION OF THE DRAWINGS

FIG. 4 represents a plan view taken on line 4—4 of FIG. 3;

FIG. 5 represents a side view of a probe carrying the turbine flow meter of FIG. 1 but with the probe mounted in a threaded hole in the wall of a pipe;

FIG. 6 represents a fragmentary front view taken on the line 6—6 of FIG. 5 and showing in particular the face view of the turbine;

FIG. 7 represents in a slightly reduced scale a probe mounted in a threaded boss welded in the side of a pipe;

FIG. 8 represents the probe of FIG. 5 mounted on the right angle flange of a T-connection of a pipe, and FIG. 9 represents the probe of FIG. 5 mounted for immersion or extraction in one connecting opening through a gate valve and into an active flowing pipe.

In the following description and in the claims various details will be identified by specific names for convenience, these names, however, are intended to be generic in their application. Corresponding reference characters refer to like members throughout the several figures of the drawings.

The drawings accompanying, and forming part of, this specification disclose certain details of construction for the purpose of explanation of the broader aspects of the invention, but it should be understood that structural details may be modified in various respects without departure from the concept and principles of the invention.

DESCRIPTION OF THE PREFERRED EMBODIMENT

Figure 1:
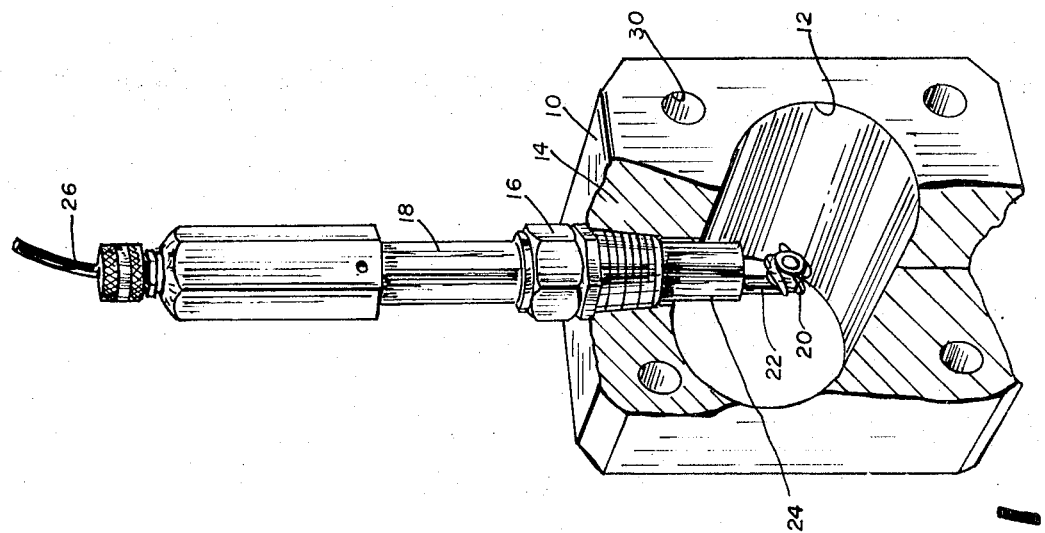
FIG. 1 represents an isometric view of a probe having a mounted turbine on the inner end thereof and with the probe mounted in a block having an axial flow passageway therethrough and with the block partially cut away to show the method of mounting of the probe in the block.

Referring now in particular to FIG. 1 the flow meter depicted is carried in a block 10 which may be of plastic and has a through bore or passageway 12 substantially central of the block. In the side of this block and substantially at right angles to the bore 12 there is a threaded aperture 14 adapted to retain a tapered hydraulic fitting 16 which is shown screwed therein. Slidably retained in this hydraulic fitting which preferably is a standard compression fitting is a probe shaft 18 which carries on its inner end a bladed turbine 20 freely rotatably supported on a stanchion member 22. A magnetic pickup and transducer, not shown, is carried at the lower end 24 of the probe stem 18. The transducer or other electronic apparatus is carried within the confines of the probe 18 and developed signals are fed through the probe shank and to the top of the probe stem 18. These signals are sent through an electrical conductor 26 to display means, not shown. In the block itself, through holes 30 may be threaded or may be smooth holes disposed to accept bolts used with hydraulic flange or end fittings conventionally used to join large diameter pipes.

USE AND OPERATION

As depicted the sweep diameter of the turbine 20 carried on spindle or support 22 is of a diameter which is at least slightly less than the diameter of the probe shaft 18 which is freely movable in and through the determined diameter threaded bore 14 provided in the housing 10. This size relationship permits the turbine end of the probe to be readily moved through the bore 14 in the side of the housing and into a midportion of the passageway 12. It is, of course, readily apparent that the block 10 is made to accommodate a pipe of a determined size with the bore also made of a like compatible size. In the construction of the block the only requirement is that the threaded aperture 14 formed in the side of the block be of a determined size such as for example seven-eighths to one inch to freely pass the shank 18 of the probe.

FLANGED PROBE SUPPORT OF FIGS. 2, 3 AND 4

Figure 3:
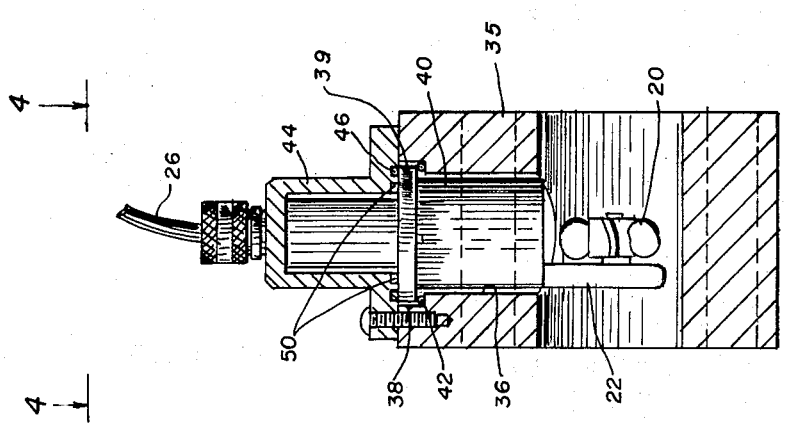
FIG. 3 represents a sectional view taken on line 3—3 of FIG. 2 and showing a side view of the flange-supported turbine flow meter assembly.
Figure 2:
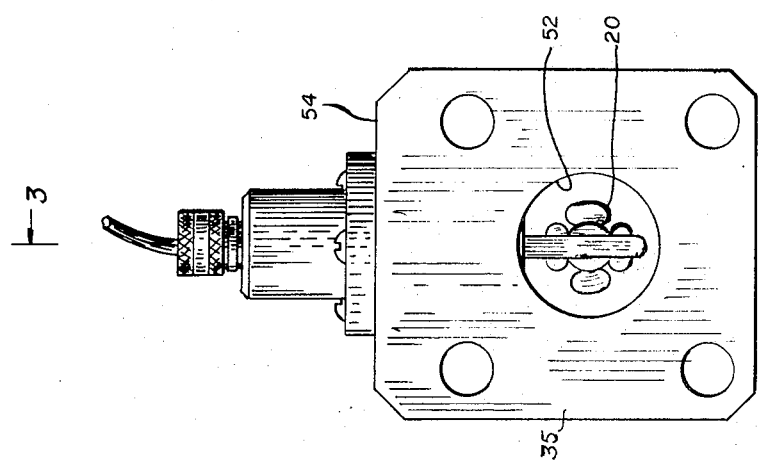
FIG. 2 represents a face view of an alternate assembly wherein a block carries a probe having a flange mounting and with the turbine aligned with its axis in the center of the stream flow.

As seen in FIGS. 2, 3 and 4 instead of the probe 18 being carried by a hydraulic fitting 16 the probe may be carried by means of a flange of determined configuration, which flange is held in a determined orientation in a housing by means of an upper retaining collar in a housing or block 35. In this block is formed a bore 36 which has its upper end provided with a counter bore 38 adapted to receive the larger flange diameter 39 of a support or stem 40. This support stem carries on its lower end the turbine 20 and its support stanchion 22. A rubber O-ring 42 is seated below the flange portion 39 and is pressed into position by means of upper flange retainer 44 which also seats upon an O-ring 46 to prevent a flow of fluid or dirt from the outside to creep under flange 39 and get into the interior portion of the flow meter. Three cap screws 48 (FIG. 4) are adapted to pass through equally spaced holes in the flange portion of member 44 and into tapped holes in block 35. Diametrically opposite lugs 50 formed on top of the support housing 35 are disposed to line up the support 40 prior to the securing of this meter assembly in the block. In this arrangement the blocks are made of a determined size with the fluid conducting bore 52 positioned at a determined distance down from the top 54 of the housing insuring that the axis of the turbine 20 is in the middle of the flow of fluid through the bore 52. As in the prior assembly, the turbine 20 is much smaller than bore 52 in this assembly.

DESCRIPTION OF THE EMBODIMENT OF FIGS. 5 AND 6

Referring next to FIGS. 5 and 6 it is to be noted that the turbine 20 is carried upon a support 22 by means of a shaft 23 so that the turbine may be freely rotatable on this shaft. In the stem 18 is carried the magnetic pickup, not shown, and at the upper end of this stem is carried the hydraulic compression fitting 16 as used in FIG. 1. The top of the apparatus is as described in FIG. 1, however, instead of being carried in a block 10, a threaded hole 60 is provided in pipe 62 so that the hydraulic fitting 16 may be installed in a fluid tight manner. The nut 64 is loosened to allow the probe stem 18 to be slid up and down to the desired position so that the axis 66 of the turbine 20 coincides with the axis 66 of the pipe in which the turbine 20 is rotated.

Referring next to FIG. 6 the turbine 20 is shown as having four blades, however, the number of blades is merely a matter of selection and as reduced to practice it has been found that the turbine blade may be a molded plastic member and carried therein is an imbedded small magnetic component providing the desired attraction for the magnetic pickup carried in the lower portion of the stem 18.

The turbine 20 may also be molded of a suitable plastic impregnated with a magnetic compound so that each blade provides a magnetic attraction to the magnetic pickup thus increasing the number of output pulses for each revolution of the turbine and thus increasing the resolution and accuracy of the flow measurement. Whether with a single magnet or with attracting blades the turbine is preferably carefully balanced and is light in weight and relatively small in diameter so as to impose a light load on the shaft 23.

EMBODIMENT OF FIG. 7

Referring next to FIG. 7 it is to be noted that instead of a pipe 62 with a pipe thread formed in the wall thereof that in a thinner walled tubing 70 a threading boss 72 is welded to its side to provide a portion substantial enough to permit a pipe thread to be formed therein to carry the probe of FIGS. 5 and 6 in a manner like that of FIG. 5.

EMBODIMENT OF FIG. 8

Referring next to FIG. 8 there is depicted a pipe fitting having a T-shaped member 80 having flanged ends 82 and 83. This structure is a conventional configuration and construction in which the right-angled pipe flange 84 is closed by a reducing flange 85 in which a pipe thread is formed in its midportion and adapted to receive the fitting 16 of the assembly of FIG. 5. After the mounting of this fitting 16 in the reducing flange 85 the probe 18 is slid up and down to the desired depth to orient the turbine 20 at a right-angled attitude to the flow of the fluid through the member 80. The probe is adjusted so that the axis of the turbine coincides with the axis of the pipe passageway. For convenience the probe is oriented by using markings on head 97 (FIG. 5) on the upper portion of the stem.

DESCRIPTION OF THE EMBODIMENT OF FIG. 9

Referring finally now to FIG. 9 there is depicted a pipe 90 having a welding boss 92 secured thereto. This boss is threaded to receive a gate or ball valve 94. In the open end 96 the probe may be mounted with the nut 64 tightened in place to retain the probe at its desired position. This probe is used with a gate or ball valve where the probe is to be installed or removed from an active flow line.

USE AND OPERATION

As reduced to practice, the flow meter probe of this invention consists of a tubular stainless steel support and a molded bladed turbine of Delrin (TM of E.I. duPont for a thermoplastic acetal resin). This turbine contains at least one small sealed magnet as carried by a blade. This turbine when centered in the fluid flow stream spins friction-free on a Monel shaft at a speed which is directly proportional to the velocity of the fluid. Each revolution of the turbine produces an electrical pulse in a coil sealed in the tubular support. Hence, in a filled pipe or duct of known dimensions each pulse represents a discrete volume of fluid. By remotely counting the total number of pulses there is provided a measure of the total volumetric flow. By measuring the frequency of the pulses one has a measure of the volumetric rate of flow. Either total flow (gallons, barrels, etc.) or rate of flow (gallons/min., millions gallons/day, etc.) may be measured individually or simultaneously. Fluid velocity may also be measured in open streams or unfilled pipes. This probe by using only one size of turbine and one small diameter of stem utilizes these fixed factors to provide an inexpensive flow meter which, because of the stem length, may be used in a pipe or conduit which is slightly larger than the turbine diameter or in any larger diameter which may be many times the diameter of the turbine.

The simple blocks 10 or 35 provide an inexpensive support for the probe as it is installed in a flow line. The installations shown in FIGS. 5 through 9 permit using the conventional pipe conduits. In particular, the gate valve assembly of FIG. 9 permits a probe to be mounted in the threaded end of the valve and then with the gate valve open to be inserted through the valve and into the stream. The turbine 20 is carried on support 22 in such a manner that the length of the support acts as a guard to prevent pushing the probe into an opposite wall of the pipe or conduit. The single unit flow meter may be mounted into an infinite number of pipe sizes and make the necessary measurements. As the probe is smaller than the pipe thread opening through the wall, the probe can be inserted into any pipe larger than the turbine and pipe thread opening as well as into an open flow or stream. Of course, the probe stem, turbine shaft and mountings can be made of any suitable material to accommodate strength and chemical resistance.

The diameter of the turbine 20 is preferably at least an eighth of an inch less than the diameter of the stem 18. This turbine diameter is the sweep diameter of the blades and the turbine is rotated in response to the fluid flow. The difference in diameter may be greater if desired. The length of the stem 18 which is carried in a compression fitting 16 is usually at least two more inches than necessary to position the axis of the turbine 20 on the axis of the flow passageway. This permits the same flow meter to be used in passageways having a maximum to a minimum diameter of four inches difference. Usually, the stem has more than three inches surplus giving a range of six inches in which the unit may be mounted. On the lower end of the stem 18 (FIGS. 5 and 6) there may be provided a stop bead or lip 98 which extends outwardly several thousandths of an inch and provides a positive mechanical stop. This stop prevents accidental expulsion of the stem and meter through a slightly loosened fitting 16.

Terms such as "left," "right," "up," "down," "bottom," "top," "front," "back," "in," "out" and the like are applicable to the embodiments shown and described in conjunction with the drawings. These terms are merely for the purposes of description and do not necessarily apply to the position in which the turbine-type flow meter may be constructed or used.

While a particular embodiment of the turbine-type flow meter and an alternate embodiment have been shown and described it is to be understood the invention is not limited thereto since modifications may be made within the scope of the accompanying claims and protection is sought to the broadest extent the prior art allows.

What is claimed is:

1. A turbine-type flow responsive device characterized in that the turbine is of molded plastic and has molded therein a magnetic attractive means disposed to cause an electrical pulse to be actuated when said turbine is rotated and the enclosed magnetic means is passed by a magnetic pickup, said flow responsive device disposed for mounting in a hydraulic connection to a through fluid passageway of determined size, said flow responsive device including: (a) a tubular stem portion which is at least two inches greater in length than the hydraulic connection in which it is to be mounted, said stem having a diameter which is less than the inner diameter of the hydraulic connection in which it is mounted; (b) means for mounting said stem portion in the hydraulic connection and in and through the wall of the fluid conductor and means for orienting and securing said stem in said hydraulic connection so that fluid is prevented from leaking past the mounted stem portion; (c) a stanchion secured to and extending from the inner end of the tubular stem; (d) a shaft supported and retained by said stanchion; (e) a turbine of small size whose diameter of rotation is less than the diameter of the passageway in the hydraulic connection in which is mounted on the tubular stem, said turbine rotatably supported on the shaft at substantially right angles to the axis of the stem so that the turbine may freely rotate in response to the flow of fluid past the turbine, the diameter of rotation of the turbine being such a small size in relation to the fluid passageway in which it is mounted that the confining walls of the fluid passage-way and the resulting distance of the walls to the turbine negate a shroud effect of the walls on the fluid flow read by the turbine; (f) a magnetic pickup carried within and near the end of the tubular stem and adapted to be actuated by the rotation of the turbine to cause an electrical pulse with every rotation of the turbine, and (g) conductive means attached to the pickup and from this pickup carried within and extending from the stem portion outside the fluid conductor so as to carry from this stem portion pulse signals to an external computing and display means so that when and as the turbine is positioned in the passageway of the fluid conductor with the axis of the turbine and the passageway substantially in coincidence the turbine is caused to be rotated in response to and in relation to the rate of flow of fluid along the passageway.

2. A turbine-type flow responsive device as in claim 1 in which the stanchion which supports the turbine has the stanchion portion constructed so as to extend beyond the sweep of the turbine to act as a guard against accidental engagement of the turbine with an interior wall of the fluid conducting passageway.

3. A turbine-type flow responsive device as in claim 1 in which the turbine has a small magnet mounted in one turbine blade.

4. A turbine-type flow responsive device as in claim 1 in which the turbine has magnetic particles mixed into the material forming the blades so that each blade as it passes by the magnetic pickup has sufficient magnetic attraction to cause a pulse to be actuated.

5. A turbine-type flow responsive device as in claim 1 in which the diameter of the tubular stem portion is at least an eighth of an inch greater than is the sweep diameter of the turbine carried on the end of said stem.

6. A turbine-type flow responsive device as in claim 1 in which the turbine is of molded plastic having a cylindrical magnet centrally mounted within the turbine for dynamic balance and with this magnet polarized to provide at least two poles.

7. A turbine-type flow responsive device as in claim 1 in which the means for mounting said stem portion in a passageway is a standard compression fitting which is tightened to retain the stem in the mounted condition and in which the turbine end of the stem has an outwardly extending stop bead which provides a positive mechanical stop to prevent accidental expulsion of the stem through said slightly loosened compression fitting.

* * * * *